United States Patent [19]

Qureshi

[11] 4,221,852
[45] Sep. 9, 1980

[54] RADIAL GRIDS FOR LEAD ACID BATTERIES

[75] Inventor: Nawaz M. Qureshi, Cleveland, Ohio

[73] Assignees: ESB United States, Inc.; ESB International Corp., both of Wilmington, Del.

[21] Appl. No.: 40,755

[22] Filed: May 21, 1979

[51] Int. Cl.² .................................................. H01M 4/73
[52] U.S. Cl. .................................... 429/211; 429/241
[58] Field of Search ............... 429/233, 234, 241, 243, 429/211, 209, 244

[56] References Cited

U.S. PATENT DOCUMENTS

| | | | |
|---|---|---|---|
| 1,528,963 | 3/1925 | Adams et al. | 429/243 X |
| 3,453,145 | 7/1969 | Duddy | 429/244 |
| 3,690,950 | 9/1972 | Wheadon et al. | 429/241 X |
| 3,989,539 | 11/1976 | Grabb | 429/241 |
| 4,118,553 | 10/1978 | Buckethal et al. | 429/234 |

*Primary Examiner*—Anthony Skapars
*Attorney, Agent, or Firm*—L. Messulam; E. C. MacQueen; R. J. Kenny

[57] ABSTRACT

A storage battery grid consisting of a frame having a lug on the upper edge thereof and spaced from a corner of the frame, a set of wires parallel to one another connecting the side edges of the frame, and a set of radial arms diverging away from the upper edge to connect that upper edge to each of the other three edges of the frame.

8 Claims, 3 Drawing Figures

RADIAL GRIDS FOR LEAD ACID BATTERIES

FIELD OF THE INVENTION

The present invention relates to storage battery grids, and more particularly to laminar lead or lead alloy grids which can be produced by casting.

BACKGROUND OF THE INVENTION

As is well known, lead acid batteries can be produced in which each electrode consists of one or more plates, each plate being composed of a laminar grid surrounded by active material. By pasting the appropriate active material onto the grids, both the positive and the negative electrodes can be produced as stacks of such laminar plates. Within each plate the grid serves as a support for the active material as well as a conductor of electricity to and from the active material. The grid is a metallic structure made of lead or a lead alloy containing small amounts of such metals as calcium, antimony or tin. The many factors which influence the design of a battery grid impose constraints which are mutually inconsistent so that designs invariably represent compromises aimed at achieving an optimum combination of characteristics. Some important design-influencing factors are:

(a) minimizing the grid weight;
(b) minimizing the internal resistance of the grid;
(c) ensuring ease of fabricability of the grid;
(d) ensuring the ability to support the required amount of active material; and
(e) providing compartments of adequate dimensions to ensure the desired size of the active material "biscuits" contained therein.

A basic design for laminar grids includes a rectangular frame having a lug at or near a corner thereof, to constitute the current carrying connection of the plate, and a plurality of wires arranged orthogonally as "verticals" or "horizontals" to divide the space within the frame into discrete rectangular pockets. (The terms vertical and horizontal are used here with reference to the orientation of the wires when the grid is mounted in a battery, i.e., with the lug uppermost). Because higher currents are carried by wires near the lug, attempts have been made to improve the resistance characteristics of such grids by use of tapering wires, increased number of verticals and use of some diagonal wires. One such grid is described in U.S. Pat. No. 3,989,539.

A different approach to improving the efficiency of grids, and one which is finding more and more favor in the art, involves adopting grids designs wherein the pattern of wires within the frame is not orthogonal. U.S. Pat. No. 3,452,145 describes grids wherein a first set of wires are disposed along the lines of radii emanating from the vicinity of the lug, while the second set of lines lie along arcs centered in the vicinity of the lug. A variation of this "radial" type of configuration is described in U.S. Pat. No. 3,690,950 wherein lightness of weight is achieved by using a frame and cross wires made of plastic, together with a set of metallic fingers radiating from a lug location to two sides of the frame. The latter type of grid requires more elaborate methods of fabrication than an all-metal grid which is castable.

I am also aware of a commercially produced battery which incorporates an all-metal grid having a lug at one corner, a set of horizontal wires and a set of diverging wires connecting the lug-carrying top of the frame to the bottom edge or to the side edge remove from the lug. Such a design is illustrated schematically in FIG. 1 of the accompanying drawings.

For several reasons it is preferable to arrange for the lug of a grid to be substantially spaced from the grid corner. One reason for this is the improvement of performance, as judged by power output at high current discharge rate. Such performance is particularly important in automotive batteries wherein high cold-cranking available power is demanded. The off-setting of the lug is also beneficial to the overall design and method of construction of batteries using the grid. Thus as is well known, the assembly of a battery involves stacking together several grids, attaching a strap to their lugs and then positioning the stacks in the battery case with separating partitions therebetween. Connections then have to be made between pairs of straps separated by a partition. In the case of grids having lugs located at their corner, the straps to be interconnected are close to the battery casing. For engineering reasons, it has generally been necessary to resort to "risers" which are offset relative to the straps so that they are sufficiently spaced from the casing. On the other hand, where lugs are themselves offset relative to the grid corner, the straps to be interconnected in the battery are sufficiently spaced from the casing to allow for a rectilinear connection through the partition which not only saves cost and weight, but also minimizes internal resistance.

If attempts are made to cast grids of the design illustrated in FIG. 1 but having lugs offset relative to the grid corner, problems of lead flow are encountered which give rise to porosity in the lug region of the frame. This is because a relatively large amount of lead has to flow from the fill edge to the lug region; grids are almost invariably cast in pairs with the fill edge being the side edge nearer to the lug, i.e, the left edge as viewed in FIG 1. The result may be an unacceptably high rate of rejection of the castings.

OBJECTS OF THE INVENTION

The invention is aimed at providing grids wherein the lug is displaced from the corner, the design of the grid being such as to enable the grids to be cast successfully.

A further object of the invention is to provide grids having performance characteristics superior to any heretofore available.

SUMMARY OF THE INVENTION

According to the invention a storage battery grid which is readily castable in lead or a lead alloy comprises:

(I) a generally rectangular frame consisting of opposed first and second edge members which constitute respectively upper and lower edges of the grid when used in a battery, and opposed third and fourth edge members which constitute side edges of the grid when used in a battery;

(II) a lug integrally formed on the first member at a location intermediate the midpoint of the first member and the common corner of the first and third members;

(III) a first plurality of wires parallel to one another and connecting one of the third and fourth members to the other of the third and fourth members or to one of the first and second members;

(IV) a second plurality of wires constituting an array of arms connected to the first member and diverging from one another such that the first member is connected to each of the second, third and fourth members by at least one of the arms.

The frame and wires are all cast as an integral unit in a single operation. While essentially pure lead can be used, the melt employed will usually comprise a lead-based alloy such as one containing a small amount of calcium, antimony or tin as used in the manufacture of the so-called maintenance-free batteries.

In accordance with one embodiment of the invention the frame houses a set of radiating arms and a set of horizontal (i.e., parallel to lug-bearing frame edge) wires. In a preferred embodiment of the invention, neither of the two sets of wires are parallel to the frame edges, the first set of wires being parallel to one another but disposed at between 10° and 45°, e.g., 15°, to the direction of the lug-bearing frame edge.

The invention will now be specifically described with reference to the accompanying drawings.

DETAILED DESCRIPTION OF THE INVENTION

Figure 1:
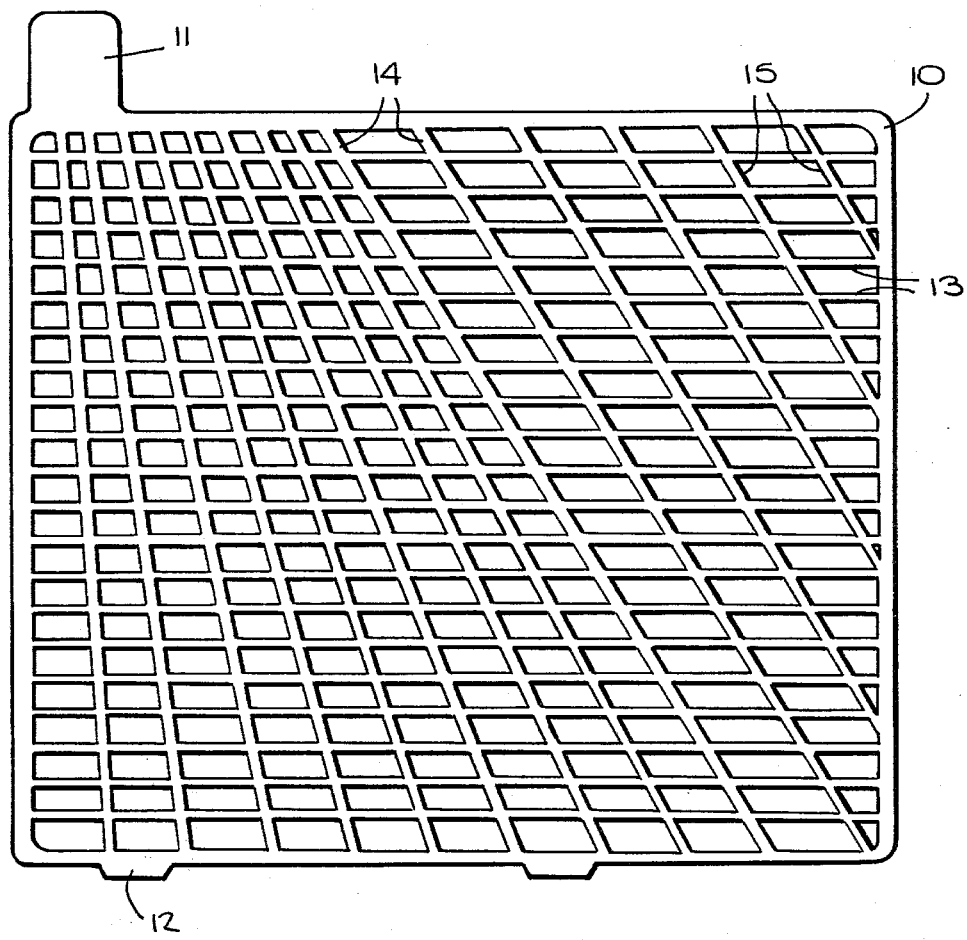
FIG. 1 illustrates a prior art grid design, not in accordance with the invention, used for purposes of comparison.

FIG. 1 schematically illustrates a grid design known to be used in a commercially available lead-acid battery. The grid in question consists of a frame 10 which is shown in the orientation in which it would be used in the battery. The top edge of the frame carries a lug 11 at the corner adjacent the left-hand edge, while the bottom edge of the frame carries feet projections 12. The frame is criss-crossed by a network of wires consisting of a set of horizontals 13 and a set of radials 14 and 15. The horizontals connect the side edges to one another, while the radials 14 and 15 connect the top edge to the bottom edge and to the right side edge respectively.

Figure 2:
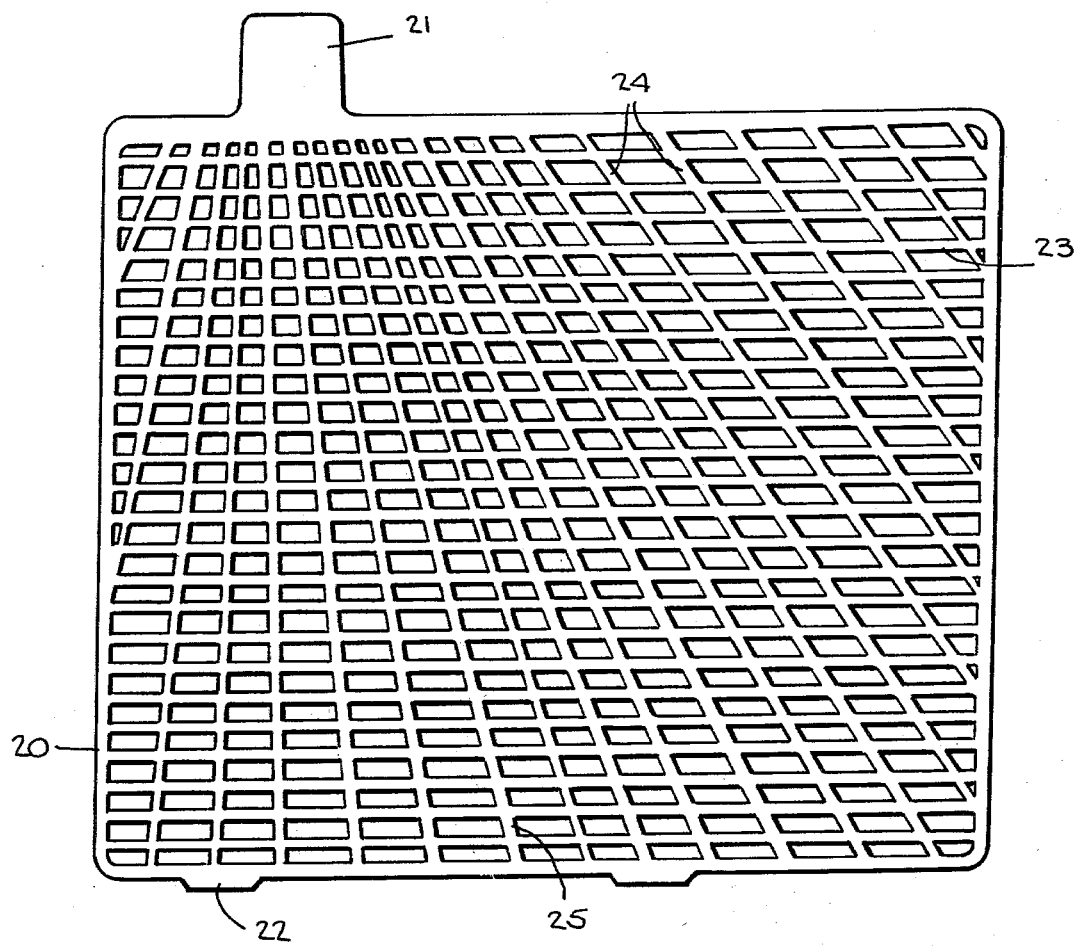
FIG. 2 illustrates the design of a grid in accordance with one aspect of the present invention.

The above prior art design can be compared with the embodiment of the invention shown in FIG. 2. In this case the frame 20 carries a lug 21 which is displaced from the left side edge of the frame. The bottom edge of the frame is provided with feet 22 in known manner. The network of wires within the frame consists of horizontals 23 and radials 24, 25 and 26. A greater number of radials is used in the design of FIG. 2 than in the grid of FIG. 1. The radials in the grid according to the invention include a plurality of arms 24 which interconnect the top edge and the right side edge, a second plurality of arms 25 interconnect the top and bottom edges, while a third plurality of arms 26 connect the top edge to the left side edge of the frame.

The presence of at least one arm such as 26 linking the left side edge to the top edge of the frame is essential to enable a grid such as that of FIG. 2 to be readily castable. The radial arms 26 terminate at points close to, and to the left of the lug 21, so that they provide direct paths for the lead to flow to the lug region of the top edge of the frame from the left side edge, which edge is used as the "fill-edge" when the grid is cast. While flow can also take place via the wires 23, this is not only a more circuitous path but a more constricted one since the wires 23 are of smaller cross-sectional area than the radial arms 26.

Grids of the design shown in FIG. 2 were cast using a lead alloy containing, by weight, 0.1% Ca and 0.5% Sn. The grids produced had twenty-one radial arms and either twenty-two or twenty-six horizontal wires. The horizontal wires were of generally hexagonal cross section and uniform throughout, having a cross sectional area of 0.47 mm$^2$. They were evenly spaced between the lug-bearing edge and foot-bearing edge of the frame. The radial arms, which were also approximately hexagonal in cross section, had thicknesses which varied from one another, and generally a given arm was not of uniform thickness throughout its length. Most of the arms tapered away from the lug-bearing edge at least from their midpoint onwards. At their thinnest points the arms were of a similar cross sectional area to the horizontal wires, while at their fattest point the cross sectional area was from 20 to 60% greater than that of a horizontal wire.

The frame for these grids measured about 14.5 × 12.4 cm exclusive of lug and foot projections. The side edge members were of approximately pentagonal cross section, the right side edge being uniformly of 2.5 mm$^2$ cross sectional area, while the fill edge tapered from a cross sectional area of 2.9 mm$^2$ at the top to a cross sectional area of 2.5 mm$^2$ at the point adjacent the foot-bearing edge. The foot-bearing edge member was of uniform generally hexagonal cross section with a cross sectional area of 2.5 mm$^2$. The lug-bearing edge member was fatter than the other three members of the frame. Its cross section was generally hexagonal, and approximately uniform from the left-most point to a point 6.5 cm away from it and tapered thereafter to the point adjacent the right side edge member. The cross sectional area was 4.8 mm$^2$ for the uniform portion adjacent the lug, and tapered to 2.7 mm$^2$ at the right-hand corner of the frame.

The grids of the above dimensions were found to be readily castable with no porosity problems in the lug region. The design was found to provide adequate rigidity to the grids without rendering them unduly heavy (typical weight being about 58 grams). To evaluate grid performance the effective resistance was determined both theoretically and experimentally. The theoretical evaluation was made with the aid of a computer simulation. The experimental test adopted involved simulating cell conditions by causing a current to flow from the lug of a grid to an electrolyte and determining the potential at various points on the grid to ascertain the maximum potential difference from the lug to a point on the grid. Assuming a current of A amps conducted by the lug, and a potential drop of mV millivolts being the maximum measured, the ratio mV/A is referred to as the effective resistance of that grid. It will be readily understood that the lower the effective resistance, the better the grid performance.

As well as evaluating the performance of grids according to the invention, prior art grids of similar size were also evaluated for the sake of comparison. A prior art grid which featured an othogonal array of 12 vertical and 22 horizontal wires was found to have an effective resistance of 2.27 mV/A. A grid of the design illustrated in FIG. 1 was found to have an effective resistance of 1.64 mV/A. Grids in accordance with the invention and having the configuration illustrated in FIG. 2 were found to have an effective resistance of 1.03 mV/A or less, representing a very marked improvement in performance over prior known grid designs. The improvement is the combined result of the careful choice of sizes and positions of the radials which is made possible by the ability to offset the lug from the frame corner in accordance with the invention.

Figure 3:
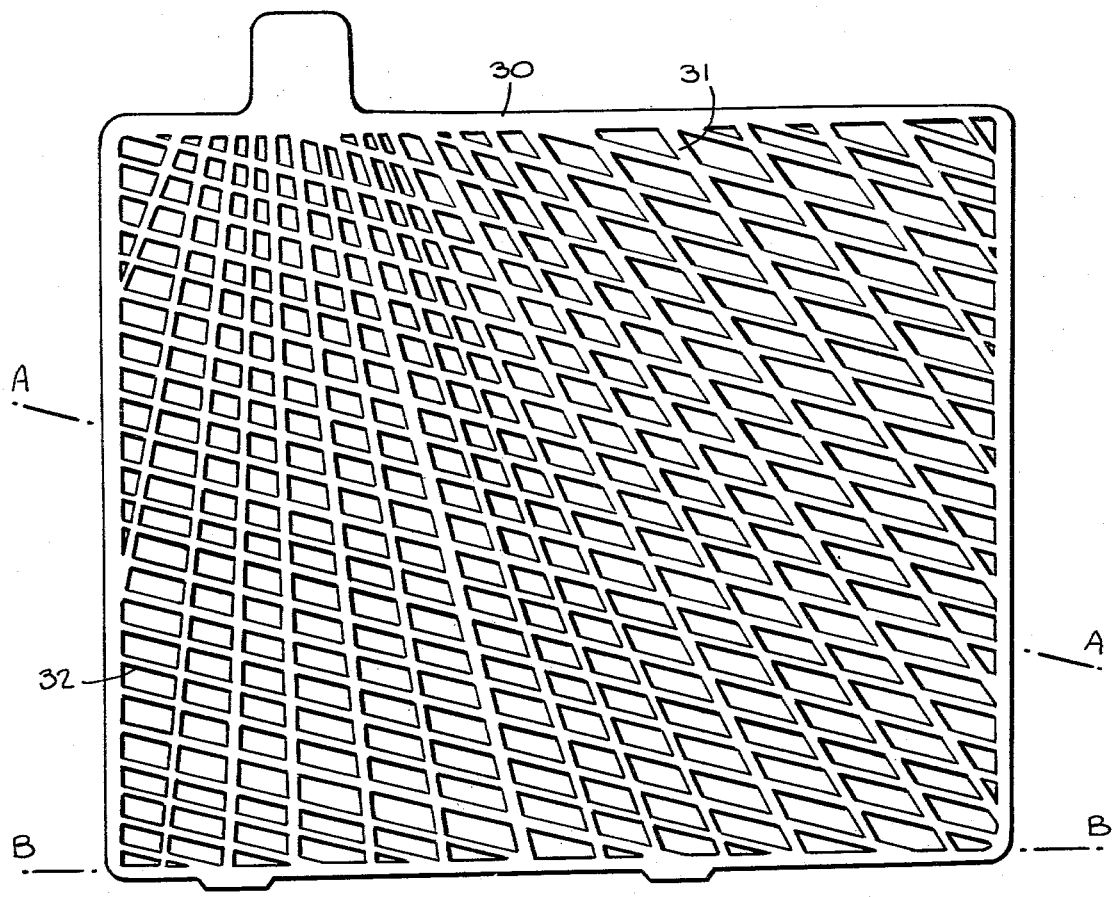
FIG. 3 illustrates another embodiment of the present invention.

The grid shown in FIG. 3 represents a preferred embodiment of the invention which in most respects is similar to the grid of FIG. 2. In this case the frame 30 contains radial arms 31 disposed in the same manner as those in FIG. 2. The other set of wires 32, though parallel to one another, and equally spaced apart, are not horizontal, i.e., they are not parallel to the top and bottom edges of the frame. Instead the wires 32 lie parallel to a line A—A which subtends an angle of 10° to 45°, typically 15°, with the line B—B drawn along the horizontal frame edges.

The arrangement of FIG. 3 offers several distinct benefits over that shown in FIG. 2. Firstly, there is improved castability in terms of the ease of flow through the wires 32. This is because during casting the edge shown at the left in the illustration is horizontally disposed as the fill edge and lead has to flow under gravity through the thin cavities representing the wires 32. Where the wires are parallel to the lug-bearing edge member, the wire cavities will be vertical during pouring and as a result air escaping from these cavities has to do so via vent bars provided in the mold surfaces. However, with oblique wires as shown in FIG. 3, air can flow out of the cavities along the same path as in-flowing lead.

A second advantage of this design lies in the improved mechanical strength which results from the fact that the cross-wire network terminates at the frame edge in a series of triangles rather than quadrilaterals. Finally, the design is of benefit to the grid performance, i.e., it is capable of exhibiting lower effective resistance. One reason for the improved performance is the greater number of wires directly connected to the lug-bearing frame member.

While the present invention has been described with reference to preferred embodiments thereof, it will be readily appreciated that various modifications may be made to the details of such embodiments without departing from the scope of the invention which is defined by the appended claims.

I claim:

1. A storage battery grid which can be produced by casting lead or a lead alloy into an appropriate mold and which comprises:

(I) a generally rectangular frame consisting of opposed first and second edge members which constitute respectively upper and lower edges of said grid when used in a battery, and opposed third and fourth edge members which constitute side edges of said grid when used in a battery;

(II) a lug integrally formed on said first member at a location intermediate the midpoint of said first member and the common corner of said first and third members;

(III) a first plurality of wires parallel to one another and connecting one of said third and fourth members to the other of said third and fourth members or to one of said first and second members; and (IV) a second plurality of wires constituting an array of arms connected to said first member and diverging from one another such that said first member is connected to each of said second, third and fourth members by at least one of said arms.

2. A grid in accordance with claim 1 wherein said array of arms includes at least two arms which connect said third member to said first member and which terminate at said first member at points intermediate said lug location and said common corner.

3. A grid in accordance with claim 1 wherein said first member is of non-uniform cross section, having a greater cross sectional area in the vicinity of said lug than at the extremity thereof remote from said lug.

4. A grid in accordance with claim 3 wherein said third member is of non-uniform cross section, having a greater cross sectional area in the vicinity of said common corner than at the extremity thereof remote from said common corner.

5. A grid in accordance with claim 4 wherein said array of arms includes arms of different cross sectional area from one another, and at least some of said arms are of non-uniform cross section, having greater cross sectional areas in the vicinity of said first member than at the extremities thereof remote from said first member.

6. A grid in accordance with claim 1 wherein said first plurality of wires comprises wires of substantially uniform cross section positioned with substantially equal spacings therebetween.

7. A grid in accordance with claim 6 wherein said first plurality of wires are disposed generally parallel to said first and second members.

8. A grid in accordance with claim 6 wherein said first plurality of wires are disposed at an angle of between about 10 and 45 degrees to said first and second members.

* * * * *